W. A. SKINNER.
COMBINATION TOOL AND LOCK.
APPLICATION FILED AUG. 21, 1919.
1,330,657. Patented Feb. 10, 1920.
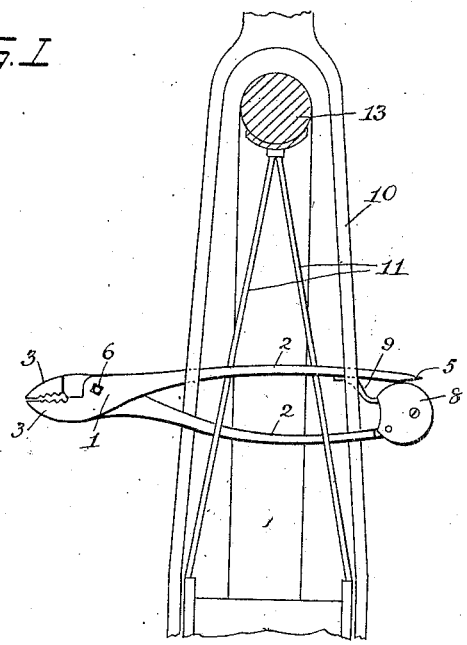
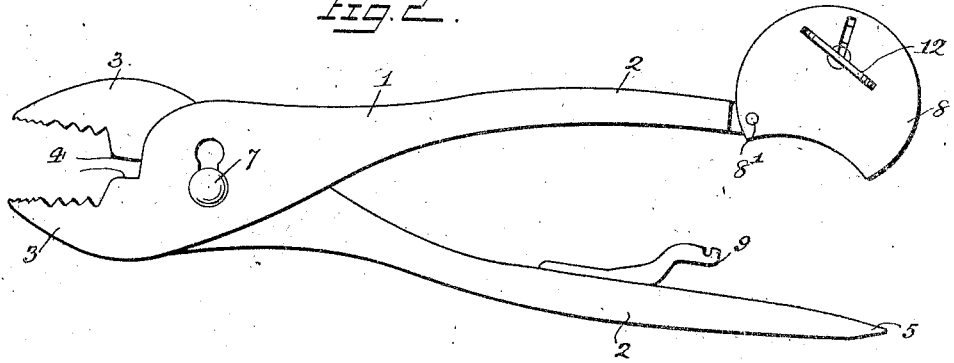
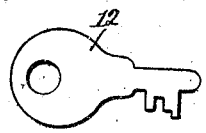
WITNESSES
H. J. Walker
S. W. Foster
INVENTOR
Willard A. Skinner
BY Munn & Co.
ATTORNEYS

UNITED STATES PATENT OFFICE.

WILLARD A. SKINNER, OF MANCHESTER, NEW HAMPSHIRE.

COMBINATION TOOL AND LOCK.

1,330,657.  Specification of Letters Patent.  Patented Feb. 10, 1920.

Application filed August 21, 1919. Serial No. 319,010.

*To all whom it may concern:*

Be it known that I, WILLARD A. SKINNER, a citizen of the United States, and a resident of the city of Manchester, in the county of Hillsborough and State of New Hampshire, have invented a new and Improved Combination Tool and Lock, of which the following is a full, clear, and exact description.

This invention relates to improvements in combination tools and locks, an object of the invention being to provide a pair of pliers with improved means for locking the handles together, so that the device may be used as a lock for bicycle wheels and the like.

A further object is to provide a device of the character stated with a lock for securing the handles together allowing them to inclose the fork of a bicycle and certain spokes of the wheel to securely lock the bicycle against possibility of movement of the wheel.

With these and other objects in view, the invention consists in certain novel features of construction and combinations and arrangements of parts as will be more fully hereinafter described and pointed out in the claims.

In the accompanying drawings:—

Figure 1 is a view showing the tool in locked position on a wheel.

Fig. 2 is an enlarged view of the tool, showing it in unlocked position.

Fig. 3 is a view of a key which may be used to unlock the tool.

1 represents a pair of pliers, having handles 2, 2, and jaws 3, 3, wire cutting faces 4, 4, may be provided on the jaws, and one handle may constitute a screwdriver 5, if desired.

The handles may have a fixed pivotal connection 6 as shown in Fig. 1 or may have a movable pivotal connection 7 at the pivot as shown in Fig. 2.

A padlock casing 8 is pivotally connected to one handle 2 as shown at 8' and is adapted to receive a hasp 9 fixed to the other handle 2 and securely lock the handles together.

A key 12 may be employed to release the lock and I would have it understood that the invention is not limited to any particular style of lock or key.

When the device is to be used as a lock for a bicycle or the like, the handles 2, 2, are positioned around the fork 10 and spoke 11 of the wheel 13 of a bicycle as shown in Fig. 1, and when the lock casing 8 is moved over to engage the hasp 9 the parts will be securely held until released by the use of the key 12.

It will be noted, particularly by reference to Fig. 2, that the lock casing can be swung on its pivot so as to provide an unobstructed entrance or passage between the handles to facilitate the placing of the tool around the fork and spokes of a bicycle or other vehicle, as shown in Fig. 1. Furthermore, it will be noted that by reason of the fact that the handle 2 carrying the lock casing is shorter than the other handle, the combined length of the short handle and the lock casing, when the latter is swung outwardly, will be substantially equal to the length of the longer handle. There is, therefore, a distinct advantage in making one handle shorter than the other and pivotally connecting the lock casing to the end of the shorter handle.

Various slight changes might be made in the general form of the parts described without departing from my invention, and hence I do not limit myself to the precise details set forth but consider myself at liberty to make such slight changes and alterations as fairly fall within the spirit and scope of the appended claims.

I claim:—

1. A device of the character stated, comprising a tool, handles on the tool, one handle longer than the other, a lock casing pivotally connected to the end of the shorter handle and adapted to be moved outwardly to present a free or substantially unobstructed passage between the handles, and a hasp on the longer handle adapted to be positioned inside of the lock casing to secure the handles together.

2. A device of the character stated, comprising a tool, pivotally connected handles on the tool, one of said handles appreciably longer than the other, a lock casing pivotally connected to the end of the shorter handle, said casing adapted to be swung outwardly and when in such position, the shorter handle and the lock casing being of a combined length substantially equal to the length of the longer handle, and a hasp on the longer handle adapted to engage the lock casing and be secured therein when the lock casing is swung to a position between the handles.

WILLARD A. SKINNER.